(12) United States Patent
Osborn et al.

(10) Patent No.: US 12,299,671 B2
(45) Date of Patent: *May 13, 2025

(54) METHODS AND ARRANGEMENTS FOR A PAYMENT INSTRUMENT WITH AN EVOLVING DESIGN

(71) Applicant: Capital One Services, LLC, McLean, VA (US)

(72) Inventors: Kevin Osborn, Newton Highlands, MA (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,958

(22) Filed: Jan. 29, 2024

(65) Prior Publication Data

US 2024/0211927 A1 Jun. 27, 2024

Related U.S. Application Data

(63) Continuation of application No. 17/984,453, filed on Nov. 10, 2022, now Pat. No. 11,887,101.

(51) Int. Cl.
*G06Q 20/34* (2012.01)
*G06Q 20/20* (2012.01)
*G06Q 20/40* (2012.01)

(52) U.S. Cl.
CPC .......... *G06Q 20/341* (2013.01); *G06Q 20/20* (2013.01); *G06Q 20/357* (2013.01); *G06Q 20/4016* (2013.01)

(58) Field of Classification Search
None
See application file for complete search history.

(56) References Cited

U.S. PATENT DOCUMENTS 11,887,101 B1 * 1/2024 Osborn .............. G06Q 20/4016

* cited by examiner

*Primary Examiner* — Kristy A Haupt
(74) *Attorney, Agent, or Firm* — KDW Firm PLLC

(57) ABSTRACT

A payment instrument comprising a bottom layer; one or more intermediate layers, wherein at least one of the one or more intermediate layers comprises: a chip comprising a processor and memory; an antenna coupled with the chip; a reactive medium; and one or more reservoirs comprising beads, each of the beads comprising a reactive agent, the beads configured to release the reactive agent over time onto the reactive medium, wherein the reactive agent causes a change over time of the surface of the reactive medium; and a top layer, the top layer having at least a partially translucent portion, the at least one partially translucent portion above the reactive medium, wherein the reactive medium is at least partially visible through the at least one partially translucent portion.

20 Claims, 9 Drawing Sheets

METHODS AND ARRANGEMENTS FOR A PAYMENT INSTRUMENT WITH AN EVOLVING DESIGN

CROSS-REFERENCE TO RELATED APPLICATIONS

Figure 1A:
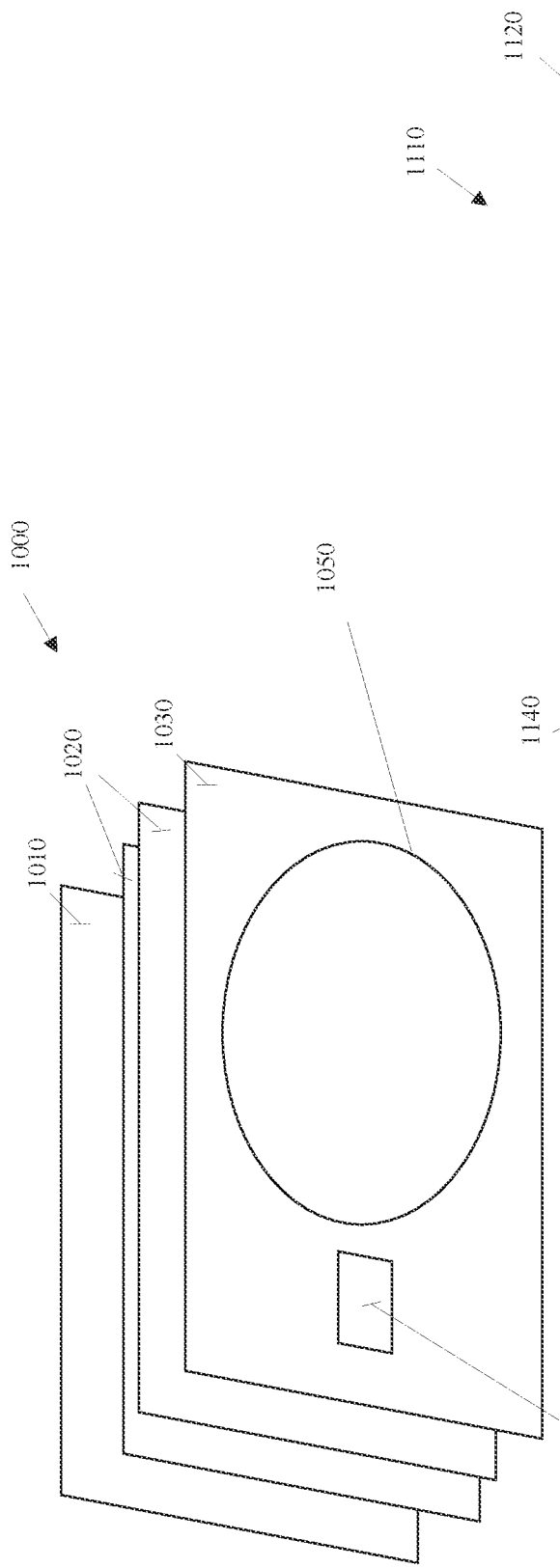

This application is a continuation of U.S. patent application Ser. No. 17/984,453, filed Nov. 10, 2022, now U.S. Pat. No. 11,887,101, the entirety of which is incorporated herein by reference.

TECHNICAL FIELD

Embodiments described herein are in the field of payment instrument design. More particularly, the embodiments relate to methods and arrangements for a payment instrument with an evolving design responsive to customer usage.

BACKGROUND

A modern credit card has three primary methods of making an in-person transaction with a merchant: tap, chip, and swipe. Each method relies on different technology embedded within the credit card. These technologies are substantially independent of one another such that one payment method may fail while the other two continue to function.

Consumers tend to carry credit cards from more than one issuing bank for various reasons. Credit cards tend to be generic or include relatively common themes such as pictures, emblems, or trademarks on the face, or top layer, of the credit cards to help to distinguish the credit cards from one another. When making a purchase, however, consumers tend to select the same credit card more often than other credit cards. Furthermore, credit cards with generic designs make it difficult to detect the difference between a counterfeit credit card and a real credit card.

SUMMARY

Embodiments may include methods and arrangements such as methods, devices, apparatuses, systems, storage media, and the like. For example, a first embodiment may include a payment instrument. The payment instrument may comprise a bottom layer; and one or more intermediate layers, wherein at least one of the one or more intermediate layers comprises: a chip comprising a chip comprising a processor, memory, a communication interface, and power converter; an antenna coupled with the chip; a reactive medium; and one or more reservoirs comprising beads. The beads may comprise a reactive agent and may be configured to release the reactive agent over time onto the reactive medium. The reactive agent may cause a change over time of the surface of the reactive medium. The payment instrument may also comprise a top layer. The top layer may have at least a partially translucent portion. The at least one partially translucent portion may be above the reactive medium, wherein the reactive medium is at least partially visible through the at least one partially translucent portion.

A second embodiment may include a payment instrument. The payment instrument may comprise a bottom layer and one or more intermediate layers. At least one of the one or more intermediate layers may comprise a chip comprising a processor, memory, a communication interface, and power converter; an antenna coupled with the chip; a reactive medium; and one or more reservoirs comprising a reactive agent. The reactive agent may at least partially coat the reactive medium in response to insertion of the chip into a point of sale (POS) terminal. The reactive coat may cause a change over time of the appearance of the reactive medium. The payment instrument may also comprise a top layer, the top layer having at least a partially translucent portion. The at least one partially translucent portion may reside above the reactive medium so the reactive medium is at least partially visible through the at least one partially translucent portion.

A third embodiment may include a method to create a payment instrument with an evolving design. The method may comprise providing a bottom layer and attaching one or more intermediate layers. At least one of the one or more intermediate layers may comprise a chip comprising a chip comprising a processor, memory, a communication interface, and power converter; an antenna coupled with the chip; a reactive medium comprising a coating of bacteria spores; and one or more reservoirs comprising beads. The beads may comprise a reactive agent, the reactive agent to activate at least some of the bacteria spores in the coating. Repeatedly activating the bacteria spores in the coating may cause a change over time of the surface of the reactive medium. The method may also comprise attaching a top layer. The top layer may have at least a partially translucent portion above the reactive medium. The reactive medium may be at least partially visible through the at least one partially translucent portion.

BRIEF DESCRIPTION OF THE DRAWINGS

FIG. 1A depicts an embodiment of a multi-layer payment instrument;

FIG. 1B depicts an embodiment of an intermediate layer, such as the intermediate layer illustrated in FIG. 1A;

FIG. 1C depicts an embodiment of a chip such as the chip illustrated in FIG. 1B;

FIG. 2A depicts an alternative embodiment of an intermediate layer, such as the intermediate layer illustrated in FIG. 1A;

FIG. 2B depicts an alternative embodiment of an intermediate layer, such as the intermediate layer illustrated in FIG. 1A;

FIG. 2C depicts an alternative embodiment of an intermediate layer, such as the intermediate layer illustrated in FIG. 1A;

FIG. 2D depicts an embodiment of a reservoir, such as the reservoirs illustrated in FIGS. 1B and 2A-2C; and FIGS. 3A-C depict embodiments of flowcharts to manufacture payment instruments such as the payment instruments shown in FIGS. 1A-B and 2A-D; and FIG. 4 depicts an embodiment of a system including a multiple-processor platform, a chipset, buses, and accessories such as a server to perform the processes described in conjunction with FIGS. 3A-C; and FIGS. 5-6 depict embodiments of a storage medium and a computing platform such as a server to perform the processes described in conjunction with FIGS. 3A-C.

DETAILED DESCRIPTION OF EMBODIMENTS

The following is a detailed description of embodiments depicted in the drawings. The detailed description covers all modifications, equivalents, and alternatives falling within the appended claims.

Customers may begin to rely on one or more payment instruments such as credit cards to perform transactions.

Many customers have typical, repetitive, or periodic expenses for which they rely on one or more credit cards. For instance, customers may use one or more credit cards to purchase gas for their vehicles once a week, eat lunch at a restaurant or cafeteria a few times a week, pick up groceries a few times a month, and/or the like. Some customers fall into a routine in which they use the same payment instrument to perform most of the day-to-day transactions because they prefer use of that card for one reason or another.

Many payment instruments are plastic and/or metal credit cards that include payment interfaces of various technologies to conduct transactions for customers. The payment interfaces may include a magnetic stripe including information associated with the customer that a card reader can read to process a transaction. Magnetic stripes contain magnetically stored information for conducting a transaction and are typically applied to credit cards as a hot foil tape. In many embodiments, the credit cards include a high-coercivity magnetic stripe that requires a higher magnetic energy to record (e.g., 4000 oersted (Oe)) than medium-coercivity (e.g., 2750 Oe) and low-coercivity (e.g., 300 Oe).

Payment instruments may also comprise a chip such as a microchip with contacts as a payment interface and such payment instruments are often referred to as Chip and PIN (personal identification number) or Chip and Signature cards. The chip may comprise a processor that has a contacted payment interface. With the Chip and PIN cards, the POS terminal, if it has the corresponding capabilities, may verify the identity of the customer with a PIN via the chip, whereas Chip and Signature cards require a signature to verify the identity of the customer. In some embodiments, the chip may also generate a packet for transmission to the payment instrument issuer such as an encrypted packet with a random number that can verify the operation of the chip and the association of the chip with the customer's account.

Payment instruments may also comprise a contactless payment interface such as a near field communications (NFC) payment interface. In some embodiments, the contactless payment interface may comprise a legacy magnetetic stripe radio frequency identifier (RFID) tag and, in further embodiments, the contactless payment interface may comprise an NFC payment interface coupled with the chip. Either or both of such contactless payment interfaces may include an antenna that is typically embedded in the payment instrument on an intermediate layer of the payment instrument and encircles a portion of the payment instrument. The antenna enables reception of radio signals and for interacting with a tap type payment interface on a POS terminal. Reception of the radio signals may include radio signals for communications between the processor on the payment instrument and the POS terminal and/or may include radio signals configured to transfer power from the POS terminal to the payment instrument wirelessly.

How consumers choose the credit card that they prefer to use may depend on several factors and one factor may be aesthetics and uniqueness of the design of the credit card. The design may catch the consumer's attention.

When the credit card is lost, stolen, or skimmed, however, the various technologies may not prevent fraudulent transactions with the credit card. For instance, the tap, chip, or swipe may be accepted with a signature or pin that can be faked, observed, or skimmed; with easily determined information such as a zip code; or with other information entered by the user on a terminal that can be monitored, seen, or skimmed. An obviously counterfeit card may catch the attention of a merchant and possibly avoid an attempt to perform fraudulent transactions in certain situations.

Embodiments may comprise a payment instrument and the manufacture of a payment instrument with an evolving design. The payment instrument may comprise three or more layers attached to for a single payment instrument. The payment instrument may comprise a bottom layer, one or more intermediate layers, and a top layer. The bottom layer may provide a foundation or base for the payment instrument. In some embodiments, the bottom layer may establish a magnitude of rigidity of the payment instrument that may be reinforced or increased by the one or more intermediate layers and the top layer.

The one or more intermediate layers may be attached (e.g., laminated, glued, or otherwise affixed) to the bottom layer. The one or more intermediate layers may comprise a chip comprising a processor, memory, a communication interface, and power converter. The chip may comprise an integrated circuit such as a system-on-a-chip (SoC) or an application-specific integrated circuit (ASIC). In many embodiments, the chip may capture energy from a point-of-sale (POS) terminal through conductive contacts on the top layer of the payment instrument or via one or more antennas coupled with a power converter. When the payment instrument is inserted into a POS terminal, the conductive contacts may contact conductive contacts of the POS terminal to power the circuitry of the chip and to establish a physical communication channel between the payment instrument and the POS terminal.

Alternatively, when the payment instrument is held close to, e.g., a near field communications (NFC) interface of a POS terminal, the POS terminal may wirelessly transfer energy to the payment instrument and a power converter of the payment instrument may collect the energy. The payment instrument may consume power to receive a transmission from the POS terminal and may collect energy in an energy storage until sufficient energy is collected to power a transmission of a response from the chip via a wireless radio of the communication interface.

The one or more intermediate layers may also include a reactive medium and one or more reservoirs. The reservoirs may include a reactive agent and use of the payment instrument may cause the release of the reactive agent repetitively to cause the reactive medium to change over time in response to use of the payment instrument. For instance, in some embodiments, the user may insert a payment instrument into a POS terminal to process a transaction and the process of insertion may cause a portion of the reactive agent to be released onto the reactive medium to cause a change in the reactive medium.

In some embodiments, the change may involve an oxidation of the surface of, e.g., a metallic reactive medium. In other embodiments, the change may involve, e.g., a bacteria growth from a bacteria spore coating on a reactive medium. In other embodiments, the reactive agent may comprise a light-sensitive or photo-sensitive agent that changes in response to exposure to light, sunlight, or a particular range of light. As such payments are used, additional amounts of the light-sensitive agent are released onto the reactive medium to cause the appearance of the surface of the reactive medium to evolve. In still other embodiments, a light-sensitive or photo-sensitive coating is applied to the reactive medium prior to inclusion in an intermediate layer of the payment instrument and the reactive agent includes a solvent such as a developer to dissolve the photo-sensitive coating and reduce or attenuate the rate of evolution of the changes in the appearance of the reactive medium over time.

In further embodiments, the portion of the reactive medium precoated with a reactive agent may form a pattern such as a logo, a code, a security feature, a combination thereof, and/or the like. For instance, the reactive medium may include a pattern that is a security feature, or the security feature may be applied to the reactive agent and may either remain invisible except under certain light conditions or may slowly appear over time as the surface of the reactive medium changes. In such embodiments, the security feature may facilitate detection of counterfeit payment instruments.

In many embodiments, the reactive agent may be placed into a cavity of one or more of the intermediate layers. In some embodiments, the reactive agent is encapsulated in a bead that may be stored in a cavity of one or more of the intermediate layers and may be crushed in response to insertion of the payment instrument into a POS terminal. In further embodiments, the beads may dissolve over time to release the reactive agent onto the reactive medium over time.

In some embodiments, a coating may be placed on the reactive medium to prevent or attenuate changes in the appearance of a portion of the surface of the reactive medium. In some embodiments, the coating may form a pattern such as a logo, a code, a security feature, a combination thereof, and/or the like.

Figure 1B:
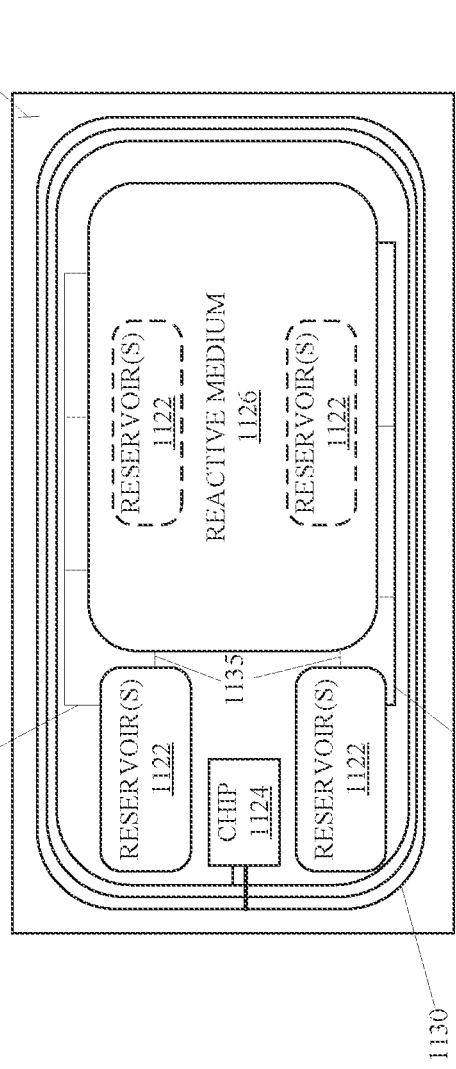
Figure 1C:
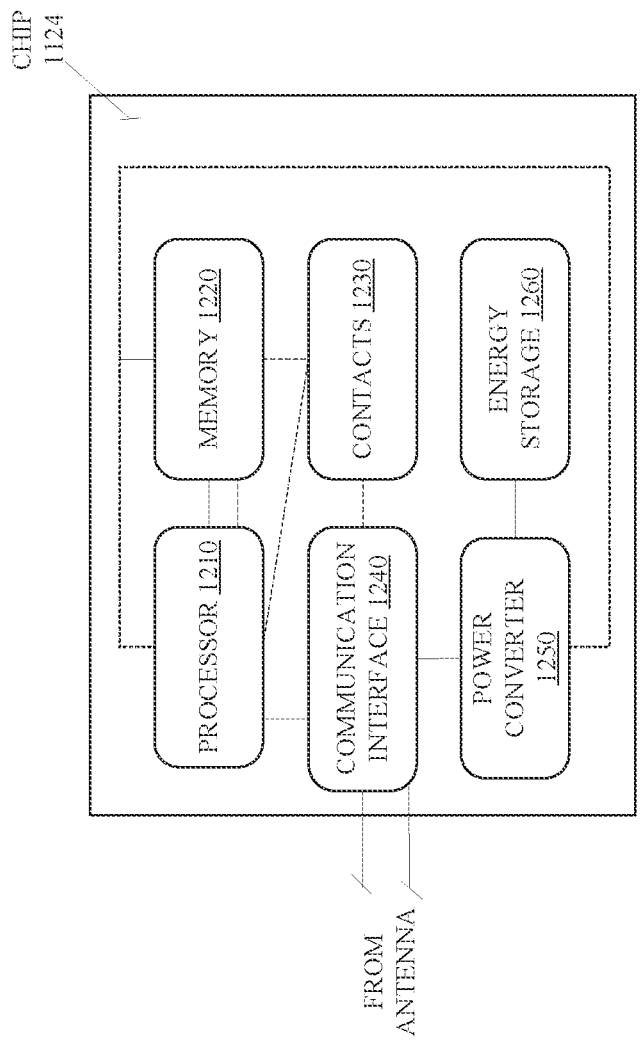

Turning now to the drawings, FIGS. 1A-C depict embodiments of payment instruments such as credit cards with contacted and contactless payment interfaces. Some embodiments may also have a magnetic stripe attached to the payment instrument.

FIG. 1A shows a multi-layer payment instrument 1000. The multi-layer payment instrument 1100 comprises a bottom layer 1010 or base layer, one or more intermediate layers 1020, and a top layer 1030. The bottom layer 1110 may form a foundation for the multi-layer payment instrument 1000 that provides structural integrity and a desired amount of rigidity. The one or more intermediate layers 1020 may include one or more laminations attached to the bottom layer 1010 to add functionality such as a chip 1124, antennas 1130, a reactive medium 1126, reservoir(s) 1122, and the like illustrated on an intermediate layer 1120 in FIG. 1B.

The chip 1124 may comprise one or more layers of printed circuits and/or circuit elements embedded into the intermediate layers. In some embodiments, at least a portion of the chip 1124 may be printed on or embedded into the bottom layer 1010. Contacts 1040 for the chip reside on the top layer 1030 to physically connect with contacts in a POS terminal to provide a contacted payment interface. Furthermore, the top layer 1030 may include at least a translucent portion 1050 to view the reactive medium 1126 through the top layer 1030.

In some embodiments, the translucent portion 1050 may be transparent. In other embodiments, the translucent portion 1050 may comprise a tint or have a partial opacity to filter the appearance of the reactive medium 1126.

The antennas 1130 may form one or more loops of conductive material printed on the intermediate layer 1120 about the multi-layer payment instrument 1000. In some embodiments, the one or more loops of conductive material may be printed in different sizes to capture different types of signals such as near field communications (NFC) or wireless power transfer. In some embodiments, the chip 1124 may select the antenna configuration based on the functionality in use.

In some embodiments, the reactive medium 1126 may comprise a metallic medium such as a metal like copper, aluminum, steel, and/or the like. The metal may comprise one or more pieces of thin solid metal such as a piece of foil, one or more pieces of a metal mesh or screen, one or more metal flakes intermixed in a thin resin painted on the intermedial layer, a combination thereof, and/or the like. In some embodiments, the reactive medium 1126 may comprise a coating applied to facilitate a reaction by the surface of the metallic medium with a reactive agent included in the reservoir(s) 1122, to initiate a reaction that is modified (slowed, sped up, or otherwise modified) by the reactive agent included in the reservoir(s) 1122, or to prevent at least a portion of the surface of the reactive medium 1126 from reacting to the reactive agent reactive agent included in the reservoir(s) 1122.

The reservoir(s) 1122 may comprise one or more cavities to contain the reactive agent. The cavities may be located about the reactive medium 1126 to disperse the reactive agent in patterns that may be dependent upon specific usage of a payment instrument 1000. For instance, FIG. 1B illustrates two reservoir(s) 1122 located adjacent to the chip 1124. When the payment instrument 1000 is inserted into a POS terminal, the contact with the POS terminal may cause the reservoir(s) 1122 adjacent to the chip 1124 to release some of the reactive agent on to the reactive medium 1126. In some embodiments, the reservoir(s) 1122 may disperse the reactive agent directly on to the reactive medium 1126 through a channel 1135 with a single connection interconnecting the reactive medium 1126 with the reservoir(s) 1122. The channel may be between a reservoir on a layer underneath the reactive medium 1126 up to the reactive medium 1126 and/or may include a channel directly from the reservoir on the same intermediate layer 1120 as the reactive medium 1126. In other embodiments, the reservoir(s) 1122 may couple with a channel with multiple connections 1140 to the reactive medium 1126.

In some embodiments, the reactive medium 1126 comprises a different material and the reactive medium 1126 comprises a surface layer that is metallic, contains metals, and/or the like. In other embodiments, the reactive medium 1126 comprises any material surface coated with bacteria spores and the reactive agent in the reservoir(s) 1122 may comprise a bacteria spore activation solution such as water.

In some embodiments, the reactive agent resides in beads. The beads may have a coating that dissolves over time and/or ruptures when pressure is applied to the reservoir(s) 1122. For instance, a user may press on the payment instrument 1000 firmly on one of the reservoir(s) 1122 and that pressure may burst some of the reactive agent beads, causing the reactive agent to contact the surface of the reactive medium 1126. The reactive medium 1126 may react by a change in appearance such as oxidation of the metallic surface, reaction to light for a light-sensitive reactive agent, or growth of the bacteria over time. The greater the quantities of the reactive agent, the greater the reaction on the reactive medium 1126 in some embodiments.

In other embodiments, the reactive agent may slow a process of oxidation of the surface of the reactive medium 1126, reduce the amount of a light sensitive coating on the surface, or reduce the growth of bacteria. In some embodiments, some of the reservoir(s) 1122 may include a first reactive agent to hasten the pace of oxidation, increase the sensitivity to light or the areas of the surface that are sensitive to light, or increase the growth of bacteria on the surface of the reactive medium 1126. And other reservoir(s) 1122 in the payment instrument 1000 may include a second reactive agent to dilute, reduce, or stop the effect of the first reactive agent.

FIG. 1C depicts an embodiment of a chip 1124 such as the chip 1124 illustrated in FIG. 1B. The chip 1124 may comprise an integrated circuit built via one or more layers of printed or embedded circuit patterns painted or applied to one or more intermediate layers 1120. The chip 1124 may be a system-on-a-chip (SoC), an application-specific integrated circuit (ASIC), and/or the like that includes circuitry for a contacted payment interface and/or a wireless payment interface for a POS terminal.

In the present embodiment, the chip 1124 comprises both the circuitry for contacted and wireless payment interfaces. The contacted payment interface may utilize the processor 1210, a memory 1220, a communication interface 1240, and contacts 1230 via, e.g., the dashed circuit connections. For instance, when the payment instrument 1000 is inserted into a POIS terminal, the contacts 1230 electrically connect with the POS terminal, providing power to the processor 1210, the memory 1220, and the communications interface 1240. The communications interface 1240 may receive a communication via the contacts 1230 and provide at least part of the communication to the processor 1210. The processor 1210 may access the memory 1220 to respond to the communication and cause the communication interface 1240 to respond to the communication via the contacts 1230.

The wireless payment interface may utilize the processor 1210, the memory 1220, the communication interface 1240, a power converter 1250, and an energy storage 1260. For instance, when brought near a NFC radio in the POS terminal, the antenna 1130 may receive energy transmitted from the NFC radio and collect the energy in the energy storage 1260, once the voltage on the energy storage reaches a minimum voltage level for operation of the processor 1210, the memory 1220, and the communication interface 1240, communication interface 1240 may receive a communication from the NFC radio of the POS terminal, and the processor 1210 may access the memory 1220 to prepare a response. Once the energy storage 1260 has stored enough energy measured, e.g., by the voltage, to power the wireless transmitter of the communication interface 1240, the processor 1210 may cause the wireless transmitter of the communication interface 1240 to wirelessly transmit the response via the antenna 1130 to the NFC radio.

The power converter 1250 may store the energy from the NFC radio transmission in the energy storage 1260, measure the voltage on the energy storage 1260, and supply power to the wireless transmitter to transmit the response via the antenna. In other embodiments, the power converter 1250 may convert the voltage of the energy prior to storage in the energy storage 1260. In some embodiments, the energy storage 1260 may comprise a capacitance-based device to store the energy. In other embodiments, the payment instrument 1000 may include a battery for energy storage 1260.

Figure 2A:
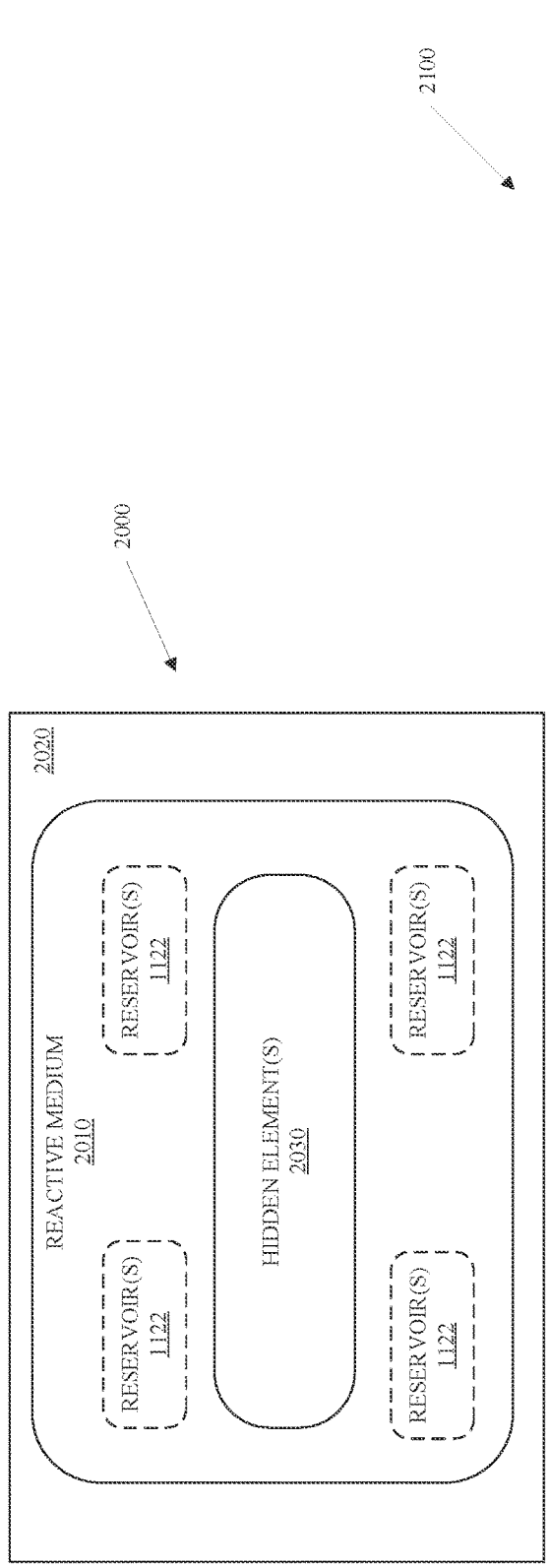
Figure 2B:
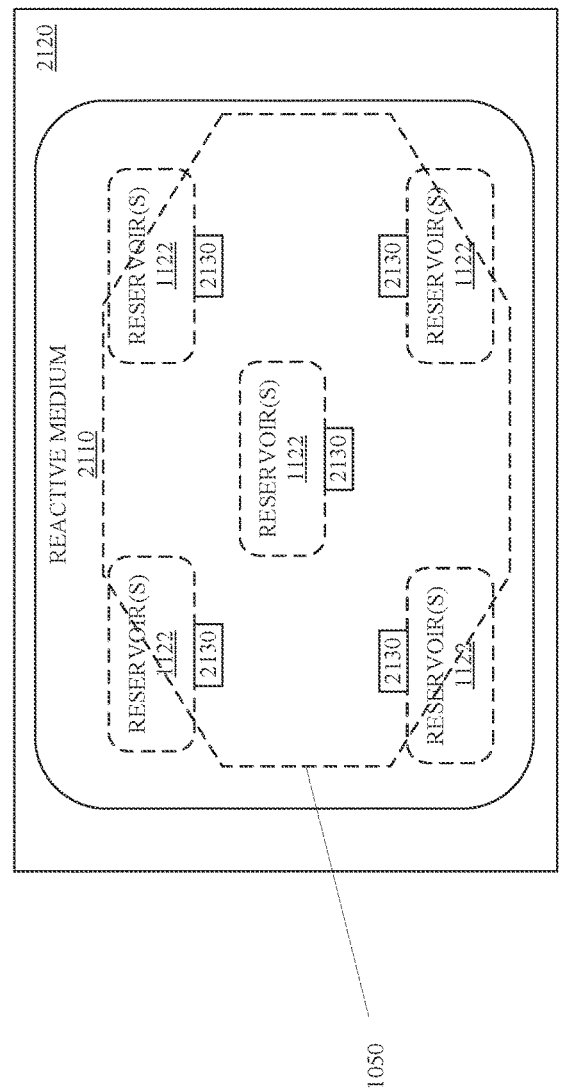
Figure 2C:
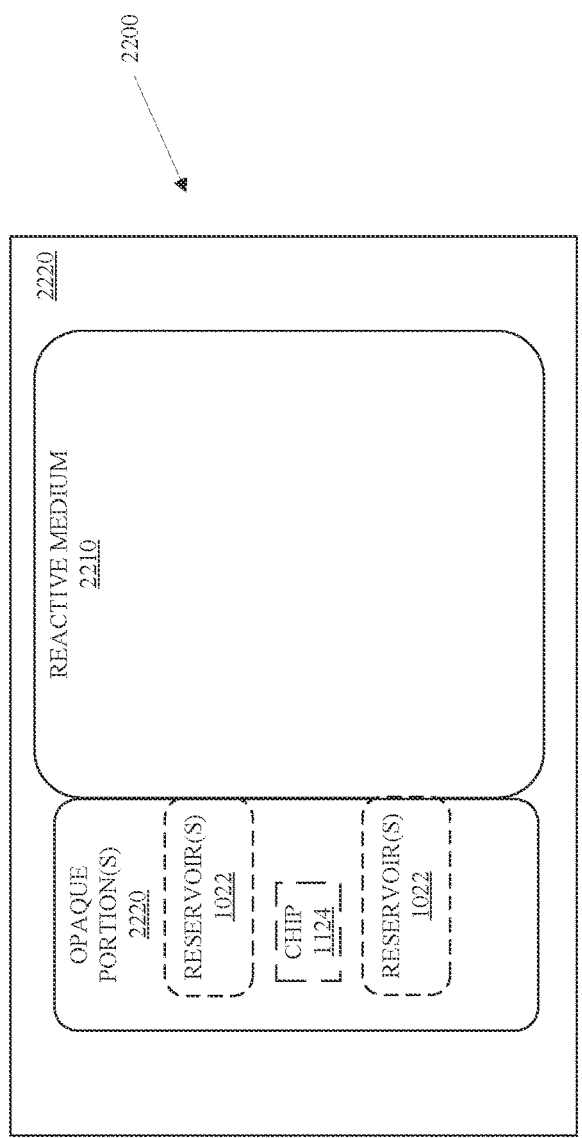

FIGS. 2A-C depict alternative embodiments of intermediate layers, such as the intermediate layers 1020 and 1120 illustrated in FIGS. 1A-1C. FIG. 2A depicts an alternative embodiment of an intermediate layer 2020 of a payment instrument 2000, such as the intermediate layer 1020 illustrated in FIG. 1A. The payment instrument 2000 may be plastic, metal, or other material. In the present embodiment, the payment instrument 2000 comprises an intermediate layer 2020. The intermediate layer 2020 may comprise a reactive medium 2010, reservoir(s) 1122, and hidden element(s) 2030. The hidden element(s) 2030 may comprise codes, logos, other graphics, words, numbers, and/or the like. In some embodiments, the hidden element(s) 2030 may provide fraud protection to help identify counterfeit payment instruments. In some embodiments, the hidden element(s) 2030 may include a security feature that can be scanned, the hidden element(s) 2030 may obscure payment instrument numbers on the face of the payment instrument as the reactive medium 1126 evolves over time, the hidden element(s) 2030 may include one or more three-dimensional (3D) features that are not present in a two-dimensional image of the payment instrument, and/or the like. The 3D features may include features that refract light at different angles to provide one or more different images that change over time in response to the reactive agent released from the reservoir(s) 1122.

FIG. 2B depicts an alternative embodiment of an intermediate layer 2120, such as the one or more intermediate layers 1020 illustrated in FIG. 1A. The intermediate layer 2120 comprises a reactive medium 2110 such as a metallic medium or other medium and multiple reservoir(s) 1122. In the present embodiment, the reservoir(s) 1122 comprise limiting valves 2130. The limiting vales 2130 may limit the amount of reactive agent released onto the reactive medium 2110 in response to pressure on the reservoir(s) 1122 from, e.g., inserting the payment instrument 2100 into a POS terminal or responsive to pressure applied by a consumer.

FIG. 2B also illustrates a translucent window 1050 of the top layer of the payment instrument 2100. The translucent window 1050 may be any shape, may include a tint of any one or more colors, may not include a tint, may be part of a security feature to detect counterfeit payment instruments, and/or the like.

FIG. 2C depicts an alternative embodiment of an intermediate layer 2220, such as the one or more intermediate layers 1020 illustrated in FIG. 1A. The intermediate layer 2220 comprises a reactive medium 2210 and multiple reservoir(s) 1122 proximate to the chip 1124. In the present embodiment, the reservoir(s) 1122 are hidden by opaque portions of the intermediate layer 2220 and/or opaque portions of the top layer 1030.

Figure 2D:
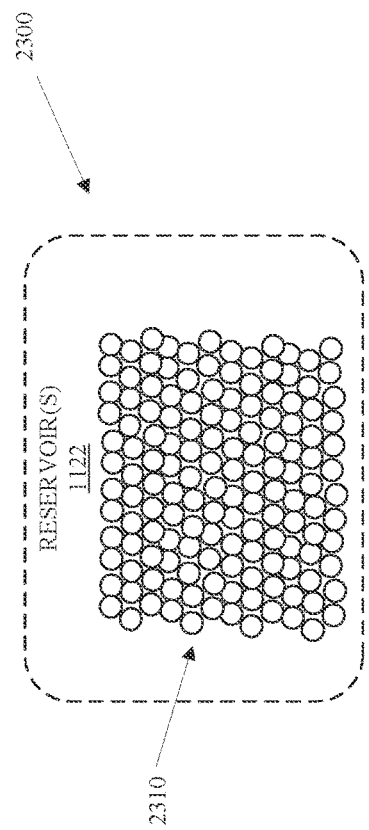

FIG. 2D depicts an embodiment of the reservoir(s) 1122 of a payment instrument 2300, such as the payment instruments illustrated in FIGS. 1A-C and 2A-C. The reservoir(s) 1122 comprise a reactive agent in the form of beads that dissolve over time and can be ruptured through use of the payment instrument 2300. In the present embodiment, the beads have a circular 2D profile and are spherical, but the beads can be any shape.

Figure 3A:
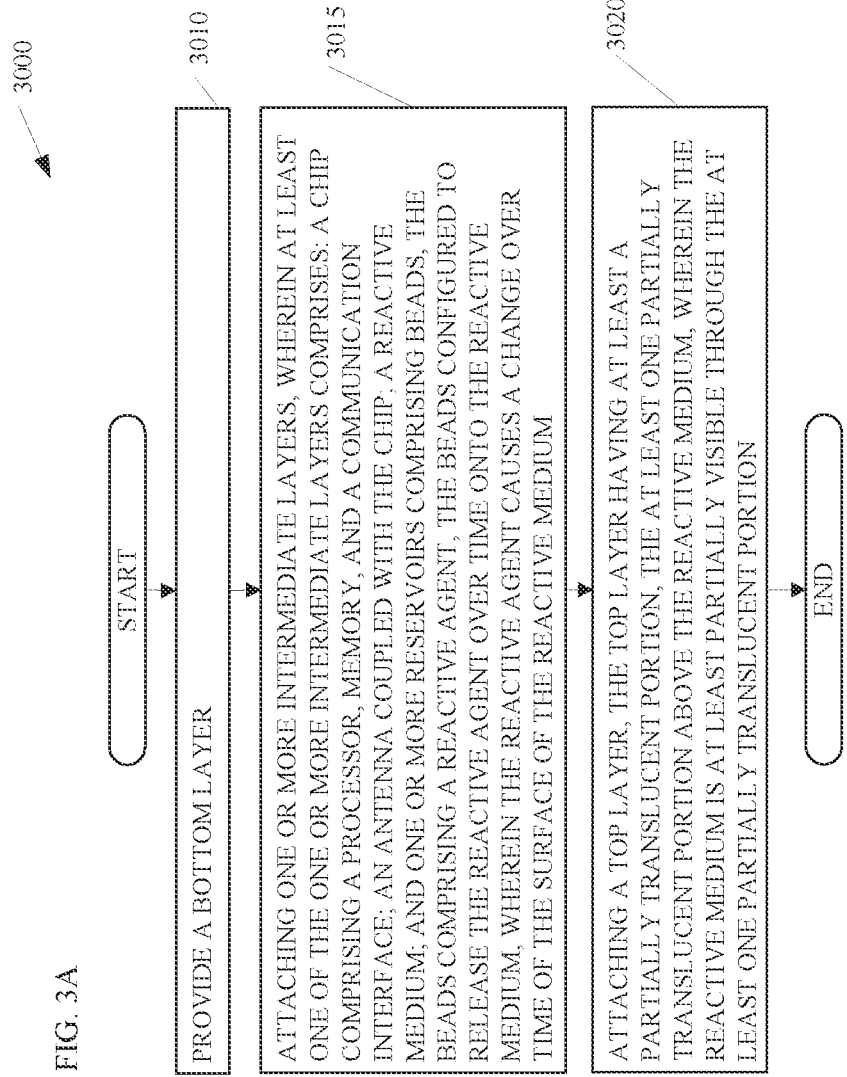

FIGS. 3A-D depict embodiments of flowcharts to manufacture payment instruments such as the payment instruments shown in FIGS. 1A-B and 2A-D. FIG. 3A illustrates a flowchart 3000 for a payment instrument with an evolving design. The flowchart 3000 starts with provision of a bottom layer (element 3010). In some embodiments, one or more reservoirs may be created in the bottom layer as cavities filled with a reactive agent in a form of, e.g., beads. Some of these embodiments may etch one or channels in the bottom layer to direct a flow of the reactive agent onto a reactive medium.

After preparing the bottom layer, one or more intermediate layers are attached to the bottom layer, wherein at least one of the one or more intermediate layers comprises: a chip comprising a processor, memory, and a communication interface; an antenna coupled with the chip; a reactive medium; and, in some embodiments, one or more reservoirs comprising beads (element 3015). The beads may comprise the reactive agent and may be configured to release the reactive agent over time onto the reactive medium. The reactive agent may cause a change over time of the appearance of the reactive medium.

Once the intermediate layers are attached to the bottom layer, a top layer is attached to the intermediate layer(s) to form the payment instrument (element 3020). The top layer may have at least a partially translucent portion above the reactive medium. The reactive medium in conjunction with the reactive agent as released from the reservoirs forms an evolving design. The evolving design of the reactive medium is at least partially visible through the at least one partially translucent portion.

In some embodiments, the beads are configured to break in response to placement of the chip into a POS terminal. In some embodiments, the beads may also or alternatively dissolve over time. In several embodiments, the reactive medium may comprise copper and the beads may comprise a reactive agent to patina the copper to a green or black patina.

In some embodiments, the reactive medium comprises a security feature to distinguish counterfeit payment instruments. For instance, one or more 2D or 3D features may be included in the reactive medium through preparation of a portion of the surface of the reactive medium to cause the one or more 2D or 3D features to change the rate of reaction different from other portions of the surface of the reactive medium. The 2D or 3D features may form codes, text, numbers, logos, other graphics, and/or the like. In some embodiments, the security feature may appear different from perspectives or points of view. For example, a code, text, number, or the like may change from a different perspective.

In some embodiments, the reactive medium may include a coating over a portion of a surface of the reactive medium to prevent the surface from reacting to the reactive agent. In some embodiments, the reactive medium may include a coating over a portion of a surface of the reactive medium to slow the surface reaction to the reactive agent. In some embodiments, the reactive medium may include a coating over a portion of a surface of the reactive medium to hasten the surface reaction to the reactive agent. Some embodiments may include beads with different reactive agents in the same or in different reservoirs and, in some embodiments, the beads with the different agents may dissolve at different rates. For example, a first set of beads may include a reactive agent to oxidize the surface of the reactive medium at a first rate. A second set of beads may include a reactive agent to oxidize the surface at a faster rate and a third set of beads may include a reactive agent to oxidize the surface at a slower rate. Furthermore, a fourth set of beads may include a reactive agent to stop oxidation of the surface of the reactive medium.

In some embodiments, the reactive medium comprises aluminum and the reactive agent comprises an oxidation agent. In some embodiments, the reactive agent comprises a photo sensitive agent, a patina agent, an oxidation agent, or water, the water to activate bacteria spores coating at least a portion of the reactive medium. In further embodiments, the reactive medium may include more than one type of metal such as metal foil, metal flakes, metal particles, and/or the like.

In some embodiments, the top layer comprises conductive contacts to electrically connect the chip with a point of sale (POS) terminal, wherein at least one reservoir of the one or more reservoirs resides in proximity to the chip to insert the at least one reservoir at least partially into a POS terminal to create an electrical connection between the conductive contacts and the POS terminal.

Figure 3B:
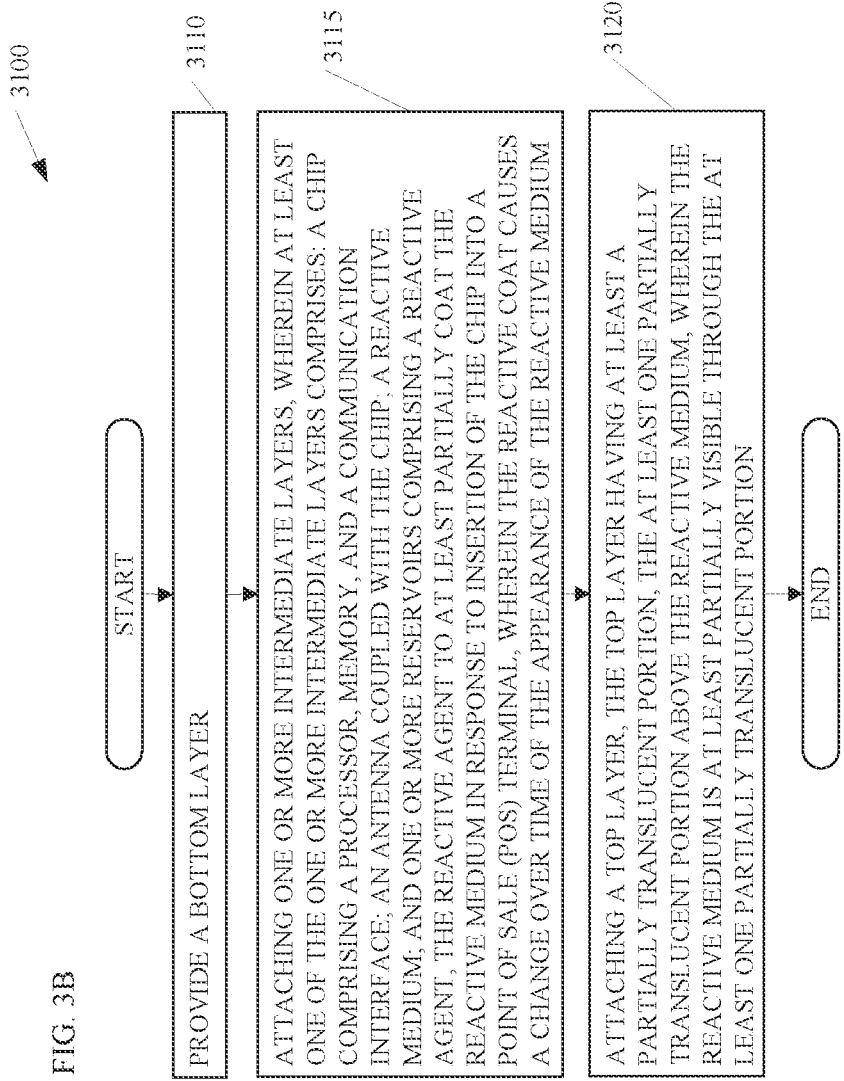

FIG. 3B illustrates a flowchart 3100 for a payment instrument with an evolving design. The flowchart 3100 starts with provision of a bottom layer (element 3110). Some embodiments may laminate the bottom layer with the one or more intermediate layers to the bottom layer and the one or more intermediate layers may comprise: a chip comprising a processor, memory, and a communication interface; an antenna coupled with the chip; a reactive medium; and one or more reservoirs comprising a reactive agent (element 3115). The reservoirs may interconnect with the reactive medium via limit valves configured to release the reactive agent over time onto the reactive medium. The reactive agent may cause a change over time of the appearance or surface of the reactive medium.

After laminating the bottom layer with the intermediate layers, a top layer is laminated over the intermediate layer(s) to form the payment instrument (element 3120). The top layer may have at least a partially translucent portion above the reactive medium. The reactive medium in conjunction with the reactive agent as released from the reservoirs forms an evolving design. The evolving design of the reactive medium is at least partially visible through the at least one partially translucent portion. In some embodiments, the at least partially translucent portion is transparent and, in some embodiments, the at least partially translucent portion is tinted.

Figure 3C:
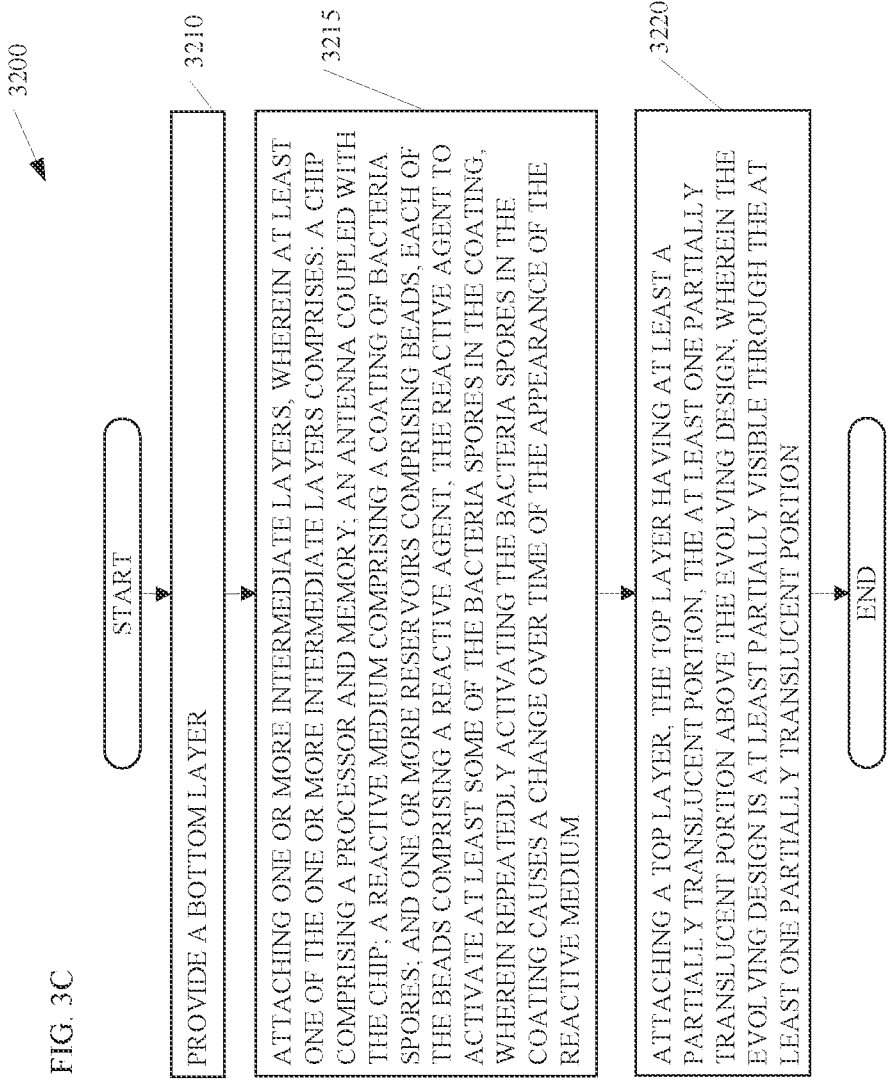

FIG. 3C illustrates a flowchart 3200 for a payment instrument with an evolving design. The flowchart 3100 starts with provision of a bottom layer (element 3110). Some embodiments may attach one or more intermediate layers to the bottom layer. At least one of the one or more intermediate layers may comprise: a chip comprising a processor, memory, and a communication interface; an antenna coupled with the chip; a reactive medium comprising a coating of bacteria spores; and one or more reservoirs comprising beads, each of the beads comprising a reactive agent, the reactive agent to activate at least some of the bacteria spores in the coating, wherein repeatedly activating the bacteria spores in the coating causes a change over time of the surface of the reactive medium (element 3215). The reservoirs may interconnect with the reactive medium via channels configured to release the reactive agent onto the reactive medium. The reactive agent may cause a change over time of the appearance or surface of the reactive medium.

After laminating the bottom layer with the intermediate layers, a top layer is laminated over the intermediate layer(s) to form the payment instrument (element 3220). The top layer may have at least a partially translucent portion above the reactive medium. The reactive medium may be at least partially visible through the at least one partially translucent portion.

Figure 4:
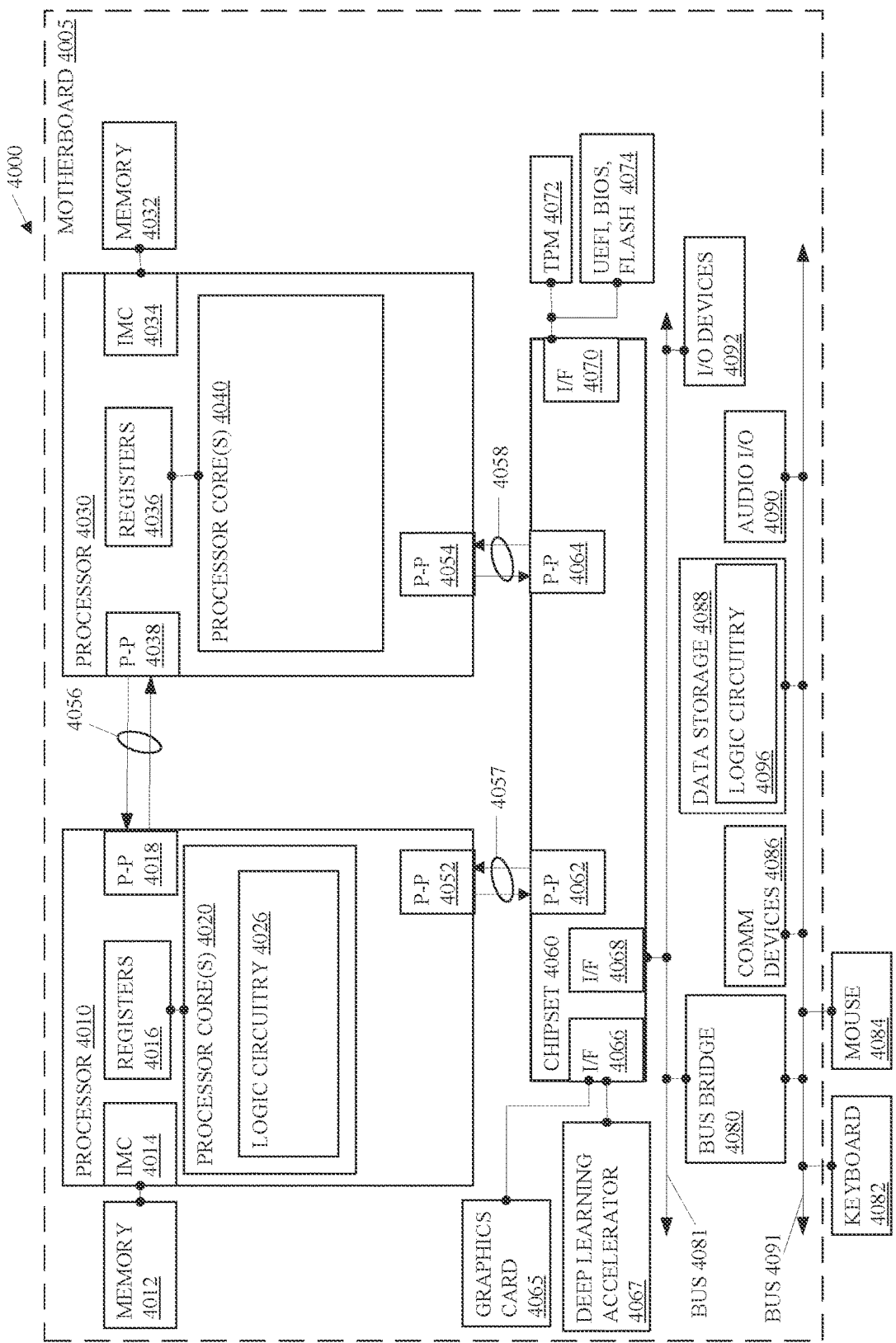

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a logic circuitry 4026 such as the processes described in conjunction with FIGS. 3A-C. The logic circuitry 4026 may represent circuitry configured to implement the functionality to manufacture a payment instrument within the processor core(s) 4020 or may represent a combination of the circuitry within a processor and a medium (such as the logic circuitry 1225 shown in FIG. 1B) to store all or part of the functionality of the logic circuitry 4026 in memory such as cache, the memory 4012, buffers, registers, and/or the like. In several embodiments, the functionality of the logic circuitry 4026 resides in whole or in part as code in a memory such as the lock logic circuitry 4096 in the data storage unit 4088 attached to the processor 4010 via a chipset 4060 such as the lock logic circuitry 1225 shown in FIG. 1B. The functionality of the logic circuitry 4026 may also reside in whole or in part in memory such as the memory 4012 and/or a cache of the processor. Furthermore, the functionality of the logic circuitry 4026 may also reside in whole or in part as circuitry within the processor 4010 and/or 4030 and may perform operations, e.g., within registers or buffers such as the registers 4016 and 4036 within the processors 4010 and 4030, respectively, or within an instruction pipeline of the processor 4010 and 4030, respectively.

In other embodiments, more than one of the processors 4010 and 4030 may comprise the functionality of the logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
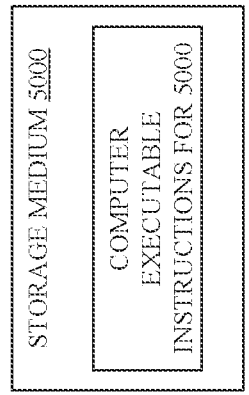

FIG. 5 illustrates an example of a storage medium 5000 to manufacture a payment instrument. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
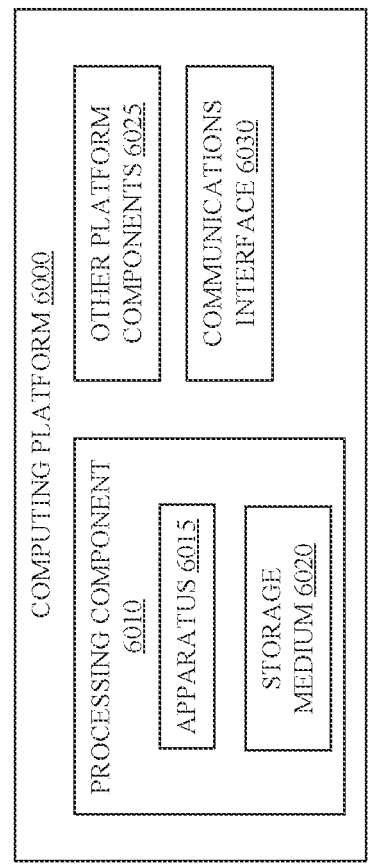

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the processes described in conjunction with FIGS. 3A-C. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included, or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. A payment instrument comprising:
   a bottom layer;
   one or more intermediate layers, wherein at least one of the one or more intermediate layers comprises:
      a chip;
      a reactive medium; and
      one or more reservoirs comprising a reactive agent, the one or more reservoirs configured to release the reactive agent over time onto the reactive medium to cause a visible change on at least part of a surface of the reactive medium; and
   a top layer, wherein at least part of the surface of the reactive medium is visible through the top layer.

2. The payment instrument of claim 1, wherein the top layer comprises conductive contacts to electrically connect the chip with a point of sale (POS) terminal, wherein at least one reservoir of the one or more reservoirs resides in proximity to the chip to insert the at least one reservoir at least partially into a POS terminal, the insertion to cause release of at least part of the reactive agent onto the reactive medium.

3. The payment instrument of claim 1, wherein a flow restriction resides between the one or more reservoirs and the reactive medium.

4. The payment instrument of claim 1, wherein one or more channels connect at least one of the reservoirs to the reactive medium within the payment instrument to direct the reactive agent to the surface of the reactive medium.

5. The payment instrument of claim 1, wherein the reactive medium comprises copper, the reactive agent to cause a patina to form on the copper.

6. The payment instrument of claim 1, wherein the reactive medium comprises a security feature to distinguish counterfeit payment instruments.

7. The payment instrument of claim 1, wherein the reactive medium includes a coating over a portion of a surface of the reactive medium to prevent the surface from reacting to the reactive agent.

8. The payment instrument of claim 1, wherein the reactive medium comprises aluminum and the reactive agent comprises an oxidation agent.

9. The payment instrument of claim 1, wherein the reactive agent comprises a photo sensitive agent, a patina agent, an oxidation agent, or an activation agent for bacteria spores.

10. A payment instrument comprising:
    a bottom layer;
    one or more intermediate layers, wherein at least one of the one or more intermediate layers comprises:
       a chip;
       a reactive medium; and
       one or more beads comprising a reactive agent, the reactive agent to coat at least part of a surface of the reactive medium to cause a change over time of an appearance of the reactive medium; and
    a top layer, the top layer wherein at least part of the surface of the reactive medium is visible through the top layer.

11. The payment instrument of claim 10, further comprising one or more beads comprising a second reactive agent, the second reactive agent to accelerate or impede the change over time of the appearance.

12. The payment instrument of claim 10, wherein the one or more beads comprise a flow restriction, restricting a flow of the reactive agent onto the reactive medium.

13. The payment instrument of claim 10, wherein beads comprising the reactive agent are configured to break in response to placement of the chip into a POS terminal.

14. The payment instrument of claim 10, wherein the beads dissolve over time.

15. The payment instrument of claim 10, wherein the reactive medium comprises copper and the beads comprise the reactive agent to cause a patina on a surface of the copper.

16. The payment instrument of claim 15, wherein the patina comprises a green patina or a black patina.

17. The payment instrument of claim 10, wherein the reactive medium comprises a three-dimensional security feature to distinguish counterfeit payment instruments.

18. The payment instrument of claim 10, wherein the reactive medium includes a coating over a portion of a surface of the reactive medium to prevent the surface from reacting to the reactive agent.

19. The payment instrument of claim 10, wherein the reactive medium comprises aluminum and the reactive agent comprises an oxidation agent.

20. A method to create a payment instrument with an evolving design, the method comprising:

providing a bottom layer;
attaching one or more intermediate layers, wherein at least one of the one or more intermediate layers comprise:
a chip;
a reactive medium; and
one or more reservoirs comprising a reactive agent, the one or more reservoirs configured to release the reactive agent over time onto the reactive medium to cause a visible change on at least part of a surface of the reactive medium; and
attaching a top layer, wherein at least part of the surface of the reactive medium is visible through the top layer.

\* \* \* \* \*